US008719117B2

(12) United States Patent
Stenz et al.

(10) Patent No.: US 8,719,117 B2
(45) Date of Patent: *May 6, 2014

(54) METHOD AND APPARATUS TO MANAGE NETWORK BASED RETURN PROCESSING

(75) Inventors: Brian G. Stenz, Gulf Stream, FL (US); Markus Lambeth, Rincon, GA (US)

(73) Assignee: AUCTNYC 5 LLC, Wilmington, DE (US)

( * ) Notice: Subject to any disclaimer, the term of this patent is extended or adjusted under 35 U.S.C. 154(b) by 2351 days.

This patent is subject to a terminal disclaimer.

(21) Appl. No.: 10/873,000

(22) Filed: Jun. 21, 2004

(65) Prior Publication Data

US 2004/0267642 A1 Dec. 30, 2004

Related U.S. Application Data

(63) Continuation-in-part of application No. 09/556,045, filed on Apr. 21, 2000, now Pat. No. 6,754,637.

(51) Int. Cl.
*G06Q 10/00* (2012.01)
(52) U.S. Cl.
USPC .......................................................... 705/28
(58) Field of Classification Search
None
See application file for complete search history.

(56) References Cited

U.S. PATENT DOCUMENTS

| | | | | |
|---|---|---|---|---|
| 5,978,774 | A | * | 11/1999 | Rogers et al. .................... 705/24 |
| 5,984,508 | A | * | 11/1999 | Hurley ........................... 700/237 |
| 6,026,374 | A | | 2/2000 | Chess |
| 6,085,172 | A | * | 7/2000 | Junger ............................ 705/28 |
| 6,155,485 | A | * | 12/2000 | Coughlin et al. ............. 235/383 |
| 6,259,367 | B1 | | 7/2001 | Klein |
| 6,269,344 | B1 | | 7/2001 | Junger |
| 6,754,637 | B1 | | 6/2004 | Stenz |
| 2002/0019777 | A1 | * | 2/2002 | Schwab et al. ................... 705/26 |
| 2003/0046180 | A1 | | 3/2003 | Chiu et al. |
| 2003/0139975 | A1 | | 7/2003 | Perkowski et al. |
| 2004/0233040 | A1 | | 11/2004 | Lane et al. |
| 2005/0061878 | A1 | * | 3/2005 | Barenburg et al. ........... 235/385 |
| 2006/0118631 | A1 | * | 6/2006 | Lubow et al. ............ 235/462.01 |

FOREIGN PATENT DOCUMENTS

| | | |
|---|---|---|
| JP | 2003-528412 A | 9/2003 |
| WO | WO 01/67344 | 9/2001 |
| WO | WO 01/72109 A2 | 10/2001 |
| WO | WO 01/82179 | 11/2001 |
| WO | WO 01/86374 | 11/2001 |

OTHER PUBLICATIONS

Inventory Management of Pharmaceuticals in Authorized Medical/Dental Allowance Lists, Elmer John A. Aguigam, Thesis published Dec. 1991, 96 pages.*

(Continued)

*Primary Examiner* — Paul Danneman
(74) *Attorney, Agent, or Firm* — Sterne, Kessler, Goldstein & Fox PLLC

(57) ABSTRACT

A return-processing server, computer-readable medium, and method for managing return processing of a product from a manufacturer includes receiving information from a database regarding the manufacturer's return procedures for a product, receiving information from a client system of a product to be submitted for return-processing, creating an electronic debit invoice in accordance with the information regarding the manufacturer's return procedures for the product and the information received from the client system regarding the product to be submitted for return-processing; and storing the electronic debit invoice in a debit invoice database accessible to the manufacturer for processing return credit.

42 Claims, 9 Drawing Sheets

(56) References Cited

OTHER PUBLICATIONS

Klein, Elliot, "RFID Technology and Returns Chat with Special Guest Elliot Klein of Intellireturn," About.com [online] Feb. 3, 2003 [retrieved on Oct. 11, 2005.] Retrieved from the Internet <http://logistics.about.com/library/blrfidandreturnschat.htm>.

Chen et al., "Small Business Internet Commerce: A Case Study," Information Resources Management Journal, Jul.-Sep. 2003, 16(3), pp. 17-41, especially pp. 31 and 35.

International Search Report for PCT/US05/21624 dated Feb. 28, 2006.

http://www.returncentral.com Return Central.com Product Site.
http://www.returnbuy.com/business ReturnBuy.com website.
http://www.returnsonline.com.
http://www.returnsonline.com/index.html.
http://www.returnsonline.com/rm.htm.
http://www.returnsonline.com/services.htm.

Non-Final Rejection mailed Nov. 22, 2002 for U.S. Appl. No. 09/556,045, filed Apr. 21, 2000, 7 pages.

Notice of Allowance mailed Feb. 13, 2004 for U.S. Appl. No. 09/556,045, filed Apr. 21, 2000; 4 pages.

International Preliminary Report on Patentability and Written Opinion of the International Searching Authority directed to related International Patent Application No. PCT/US2005/021624, mailed Dec. 28, 2006, from the International Bureau of WIPO; 7 pages.

English-Language Translation of Notification of the First Office Action directed to related Chinese Patent Application No. 200580028143.2, mailed Feb. 12, 2010, from the State Intellectual Property Office of People's Republic of China; 5 pages.

English-Language Translation of the Second Office Action directed to related Chinese Patent Application No. 200580028143.2, mailed Apr. 13, 2011, from the State Intelletual Property Office of People's Republic of China; 3 pages.

Office Action directed to related Korean Patent Application No. 10-2007-7001420, mailed Nov. 23, 2010, from the Korean Intellectual Property Office; 5 pages (with English-Language Translation of Summary of Office Action).

Preparation for Oral Proceedings for Application No. EP 05 762 660.8, Munich, Germany, mailed on Mar. 14, 2012.

Minutes of Oral Proceedings for Application No. EP 05 762 660.8, Munich, Germany, mailed on Jul. 13, 2012.

Closing of Application for Application No. EP 05 762 660.8, Oct. 23, 2012.

http://www.returncentral.com Return Central.com Product Site, Jun. 21, 2004.
http://www.returnbuy.com/business ReturnBuy.com website, Jun. 21, 2004.
http://www.returnsonline.com, Jun. 21, 2004.
http://www.returnsonline.com/index.html, Jun. 21, 2004.
http://www.returnsonline.com/rm.htm, Jun. 21, 2004.
http://www.returnsonline.com/services.htm, Jun. 21, 2004.

* cited by examiner

METHOD AND APPARATUS TO MANAGE NETWORK BASED RETURN PROCESSING

CROSS-REFERENCE TO RELATED APPLICATIONS

This application is a continuation-in-part and claims priority from prior U.S. patent application Ser. No. 09/556,045, now [Allowed], entitled "METHOD AND APPARATUS TO MANAGE NETWORK BASED RETURN PROCESSING" filed on Apr. 21, 2000, now U.S. Pat. No. 6,754,637 the entire disclosure of which is herein incorporated by reference in its entirety.

COPYRIGHT NOTICE

A portion of the disclosure of this patent document contains material which is subject to copyright protection. The copyright owner has no objection to the facsimile reproduction by any one of the patent document or the patent disclosure as it appears in the Patent and Trademark Office patent file or records, but otherwise reserves all copyright rights whatsoever.

FIELD OF THE INVENTION

The present invention generally relates to the field of product reclamation, and more particularly relates to the field of disposition of products and goods using networks.

BACKGROUND OF THE INVENTION

The distribution chain of products from a manufacturer to the seller or store typically includes several intermediate entities. FIG. 1 is a block diagram 100 of a simple product distribution chain. A product produced at a manufacturer 108 is sent to a wholesaler 106 in large quantities for further distribution. The wholesaler 106 in turn redistributes products to chain distribution center 104. The chain distribution center 104 is a regional warehouse to divide the goods received from the wholesaler 106 into smaller lots as required by the store 102. This distribution chain can be greatly expanded by including multiple wholesalers as shown wholesaler 1→n 112 along with multiple chain distribution centers 1→n 114 along with multiple stores 1→n 116.

Brand quality is important to manufacturers of products. Products that are damaged, outdated, expired, recalled, discontinued or unsaleable for any other reason are a concern for manufacturers. Unsaleable products can expose manufacturers to legal liability and may damage the manufacturer's reputation and goodwill. To increase the manufacturer's goodwill and to decrease any legal exposures, manufacturers must handle unsaleable products. Manufacturers control the return-processing to ensure the complete removal of the product from the distribution channel and managed the reclamation flow.

If the store 102 has an unsaleable product that needs to be disposed, the store typically ships the product back to a reclamation center 110. Any credits for the returned products are sent back to the store 102 from the reclamation center 110.

Manufacturers often run return centers that must inventory returned and unsaleable products, then match the unsaleable products for any claims data for payments. The process of tracking each product returned is tedious and prone to errors. The seller not only has to "sweep" their shelves and inventory occasionally for products to return but arrange for shipping and financial tracking as well. The number of products of inventory handled can be large from hundreds to thousands of products. Products returned must be tracked not only by product name, but other information must also be supplied, such as the model number, if any, and serial number and tag number distinguished. Because all the products in inventory are not from one manufacturer, the problem of tracking and handling returns from multiple manufacturers becomes even more complicated. Not only does each product have different return policies, each manufacturer may have different return policies for the same product. The processing returns for multiple manufacturers, each with distinct return policies and perhaps distinct reporting formats makes the process of tracking products even more tedious and prone to errors.

To help with the return-processing, several companies have begun offering services to aggregate all of the returns processing for the Chain distribution center 104 and stores 102. One such return aggregator is USF Processors of Dallas Texas, or Universal Solution International Inc, of Winston-Salem, N.C., or Pharmaceutical Processing Headquarters of Conyers Georgia.

USF offers a service of receiving the returned products from the stores 102, identifying which store returned what product to the manufacturers 108 (where appropriate) for receipt of return payment, if any. The return payment is sent to the corresponding store 102. The return-processing aggregation is sometimes thought of as a "reverse checkout process" because like the store "check out," products shipped to the aggregators are "scanned" into the system at the reclamation center 110. But unlike the "check out" process the products are not in inventory for sale, but in inventory for return and disposal. The aggregators typically take a percentage of the money paid by the manufacturers as a fee for processing the products for the stores.

These reclamation centers 110 and aggregator, although useful, are not without their shortcomings. One shortcoming with the current aggregator system is that the store must be associated with a large network of stores such as a chain to take advantage of services such as return-processing aggregators. The attendant paper work for return-processing is onerous. In addition, the return and disposal of many products are regulated under state and federal agencies such as the FDA (Food and Drug Administration), EPA (Environmental Protection Agency) and the PDMA (Pharmaceutical Drug Market Act). The rules that sellers 102 and reclamation centers 110 must abide by are complex. Rules are even more complex with highly regulated products such as drugs, pharmaceuticals, hazardous waste, biological products and environmentally hazardous products, such as nuclear products. Accordingly, a need exists for a method and apparatus to permit stores of any size, even the small "Mom and Pop" stores, to efficiently return products for processing while complying with the numerous government regulations.

Another shortcoming with the use of return-processing centers 110 or aggregators is that many stores that sell pharmaceuticals are not EPA regulated. Accordingly the disposal of stores trying to dispose of or return products regulated by the EPA must use reclamation centers 110 or aggregators that are EPA compliant.

Another shortcoming with the use of return-processing centers 110 or aggregators is that the processing of payments can take a long time. The return-processing aggregators must receive the product, notify the manufacturer 108 or wholesaler 106, invoice the manufacturer or wholesaler for payment and finally receive payment from the manufacturer and pay the store. This payment process often takes three to six months to complete. The delay in processing credit and payments can be substantial and for large stores the accounts receivable for a return-processing inventory can run into the millions of dollars. In addition, several state governments, such as Pennsylvania, require stores to pay taxes on inventory, even though the inventory may be unsaleable and slated to be returned. It is not until the return credit is issued that the tax liability of unsaleable inventory is eliminated. Accordingly, a need exists for a method and apparatus to expedite the processing of payments to sellers for products disposed.

Still, another shortcoming with the use of return-processing centers 110 or aggregators is the inability to efficiently handle "short-dated" inventory. Short-dated inventory is inventory that has not expired yet, but will expire within a few weeks or months. Short-dated inventory can be a large problem in such diverse industries such as pharmaceuticals and food. Although, in many instances manufacturers or wholesalers will not accept short-dated inventory until the inventory expires, there is an after market for short-dated products. Moreover, many times, stores 102 and manufacturers 108 want to donate short-dated products for tax credits. Accordingly, a need exists for a method and system to handle the processing of short-dated products for resale and donation.

SUMMARY OF THE INVENTION

Briefly, in accordance with the invention, a method in a client-server environment having a plurality of client systems coupled to a server over a network, the method on the return-processing server for managing the return-processing of one or more manufacturers. The method on the return comprising the steps of: coupling to a database containing information about the procedures for at least one manufacturer's product. The return server presents a return-processing template to at least one client system coupled to the server system over a network, wherein the template comprises a graphical user interface for receiving information regarding at least one product to be submitted for return-processing. The return-processing server the information from at least one client system of at least one product to be submitted for return-processing. The return-processing server creates a debit invoice in accordance with the manufacturer's policies for the information received for return-processing from the at least one client system. Placing the debit invoice in a debit invoice database accessible to one or more manufacturer's to access one or more debit invoices for processing return credit, and sending shipping information to the at least one client's system for shipping the at least one product submitted for return-processing.

In another embodiment, the products being returned are reviewed to determine if one or more products have a date associated with it for expiration. If the product is still usable, the product can be auctioned off or donated to charity.

In still another embodiment, a system and computer readable medium for carrying out the above method.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Glossary of Terms Used in this Disclosure database—any file format which information and data can be stored and retrieved by one or more users. The database can be implemented as one physical file or broken into separate databases such as a shipping database, a donation database, an auction database, a price database, a manufacturer's return goods policy database, wholesale database, manufacturers database and so on.

debit invoice—a document showing the reason and the authorization for creating a debit. The debit invoice may contain an itemized list of products to be returned with payment information associated with it.

disposal—the process of removing a product from inventory usually for credit or tax credit. The process of removing includes burning, destruction, break down for recycling, donation, return to stock, refurbished or re-manufacturing, or throwing into refuse.

information processing system—a system capable of processing data and information and integrated with processes such as office automation and data communication. An information processing system can be embodied in a variety of hardware such as a PC, or microprocessor-based system.

operating system—software that controls the execution of programs and that may provide services such as resource allocation, scheduling, input/output control, and data management and administration. Although operating systems are predominately software, partial hardware implementations are possible.

short-dated product—is a product that has not expired yet and has some useful life, but will expire within a few weeks or months.

unsaleable product—a product needing disposal by an entity such as a store, seller, or sales representative.

Exemplary Return-processing Server

Figure 1:
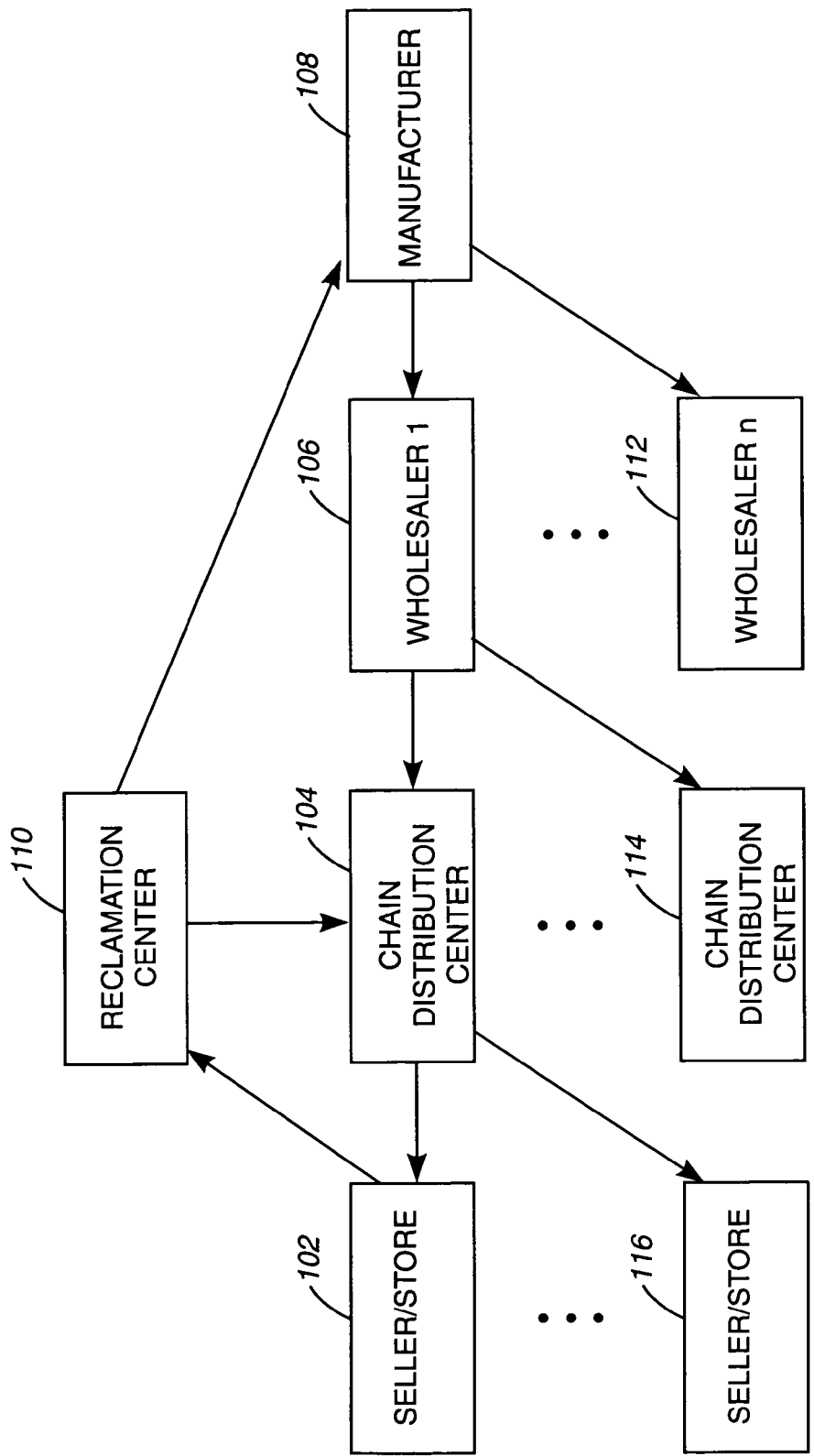
FIG. 1 is a prior art block diagram of a simple product distribution chain.
Figure 2:
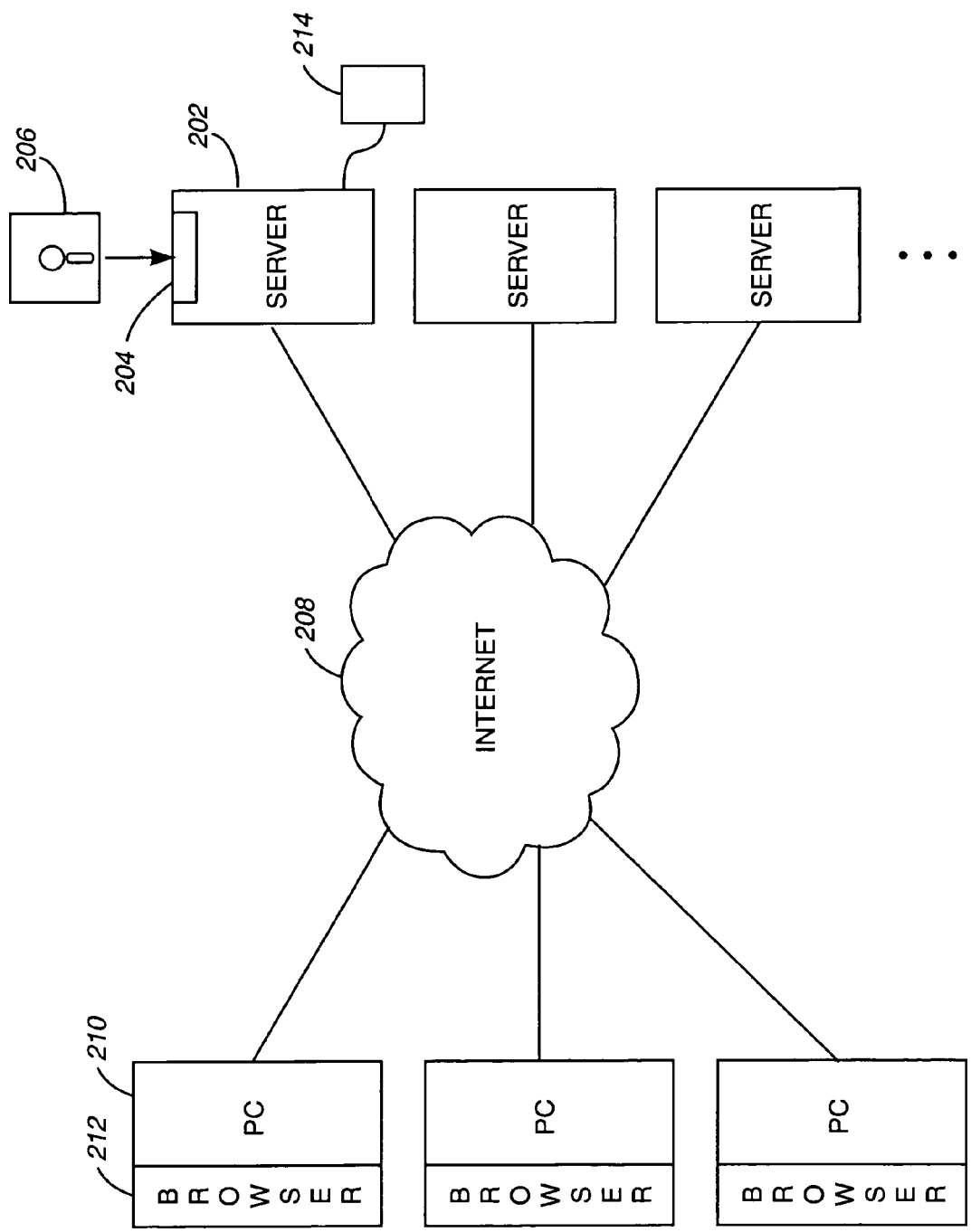
FIG. 2 is a block diagram of a client-server system for carrying out this present invention.

FIG. 2 is a block diagram of a return-processing server architecture 200 for carrying out this present invention. An e-commerce server information processing system 202, such as a PC server such as those available from IBM and Compaq or a server from Sun Microsystems or equivalent. The server 202 has an interface 204 for reading programming information from a computer readable medium 206 such as a floppy diskette, CD ROM, DVD ROM, Flash Memory or other removable computer readable medium. Each server is coupled to one or more databases 214 such as IBM's DB/2, Microsoft Access, Oracle or equivalent. The return-processing server 202 is linked to a plurality of other information processing systems over a network 316 such as a LAN, WAN, Internet, broadcast infrastructure, public switch telephone networks or through any other computer readable medium. Each of these other information processing systems 300 is now described in turn below with reference to FIG. 3.

Bank 314 is the entity which provides credit and payment information from the manufacturer 306 (or wholesaler) and the seller store 312. This credit can be through funds transfer mechanisms such as ACH transfers, wire transfers, checks and other credit vehicles.

Seller/Store 312 is the entity wishing to send a product for return-processing. In a pharmaceutical embodiment, the store is the pharmacy and the product is a pharmaceutical. In another pharmaceutical example, the seller is a sales representative that is returning "sales samples".

Carrier 310 the entity that ships products from the seller/store 312 to the short-dated buyer 308, the wholesaler 306 (or manufacturer), the return processor 304. The carrier can be FedEX™, the U.S. Postal Service, Airborne™, DHL™, RPS™ or some other third party shipper.

Short-dated Buyer 308 is an entity that may purchase a short-dated product from the seller/store 312.

Manufacturer (Wholesaler) 306 is the entity that purchases and handles large lots of merchandise from the manufacturer (not shown) for distribution, usually at a lower price.

Return Processor 304 is the entity that disposes of a returned product from a seller's inventory through burning, destruction, donation, return to stock, refurbished or re-manufacturing, or throwing into refuse.

Return-processing Server 202 is the entity that coordinates the returns of products from the sell/store 312 with all the other systems 304, 306, 308, 310 and 314 and entity that directs the primary process flows of this present invention.

Although all of these systems 202, 304, 306, 308, 310, 312 and 314 are shown interconnected via a network 316, such as the Internet, any and all of these systems can be connected through the exchange of other computer readable medium such as floppy diskettes 206, DVDs, CDs and flash memory cards.

Exemplary Return-Processing Server Hardware

Figures 4, 5:
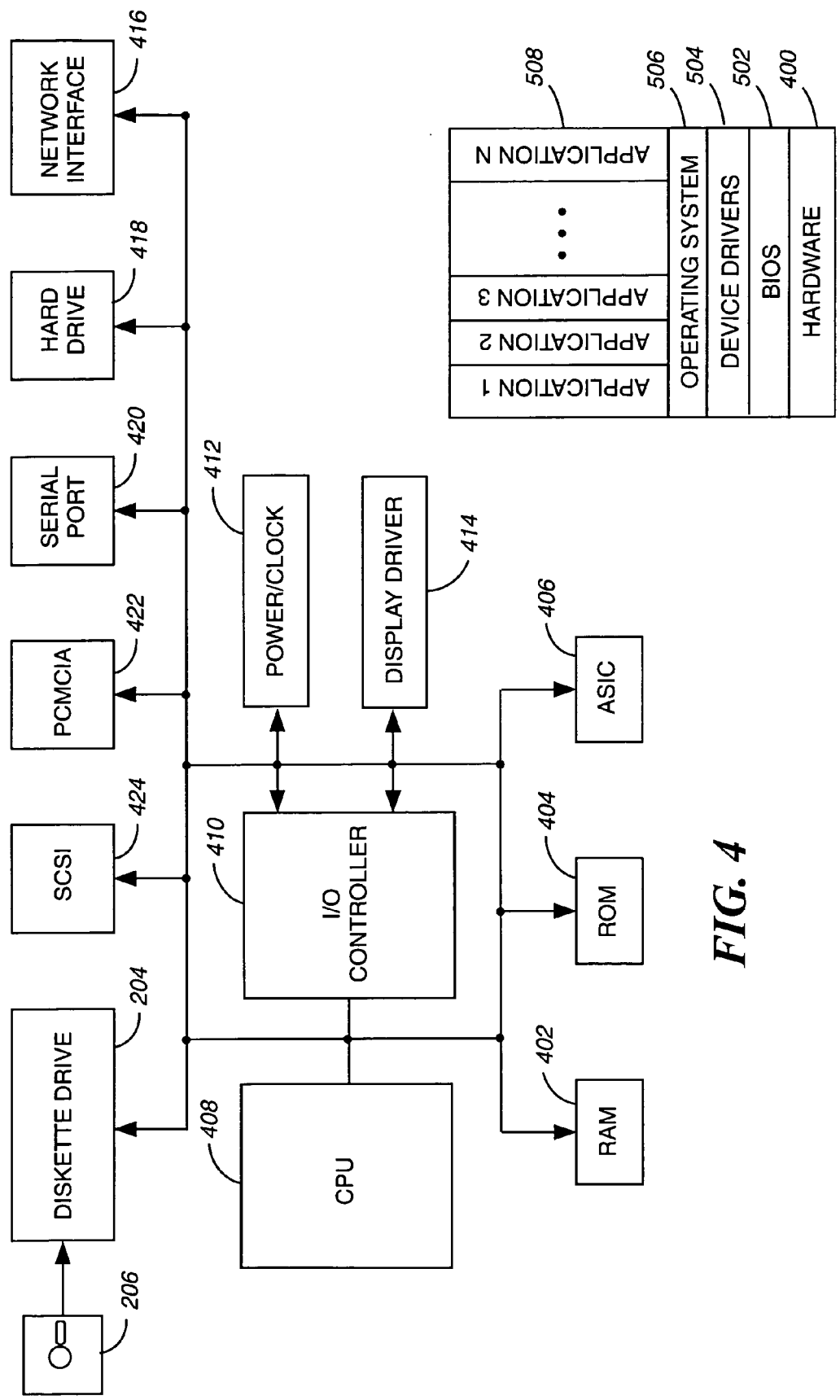
FIG. 4 is a block diagram of the major electrical components of an information processing system (server) according to the present invention.
FIG. 5 is a block diagram illustrating the software hierarchy for the information processing system (server) of FIG. 3, according to the present invention.

Referring to FIG. 4, there is shown a block diagram of the major electrical components of an information processing system 400 of the return-processing server 402 in accordance with this invention. The electrical components include: a central processing unit (CPU) 408, an Input/Output (I/O) Controller 410, a system power and clock source 412; display driver 414; RAM 402; ROM 404; ASIC (application specific integrated circuit) 406 and a hard disk drive 418. These are representative components of a computer. The operation of a computer comprising these elements is well understood. Network interface 416 provides connection to a computer network such as Ethernet running TCP/IP or other popular protocol network interfaces. Optional components for interfacing to external peripherals include: a Small Computer Systems Interface (SCSI) port 424 for attaching peripherals; a PCMCIA slot 424; and serial port 420. An optional diskette drive 204 is shown for loading or saving code to removable diskettes 206 or equivalent computer readable media.

Exemplary Software Hierarchy for Commerce Server

Figure 3:
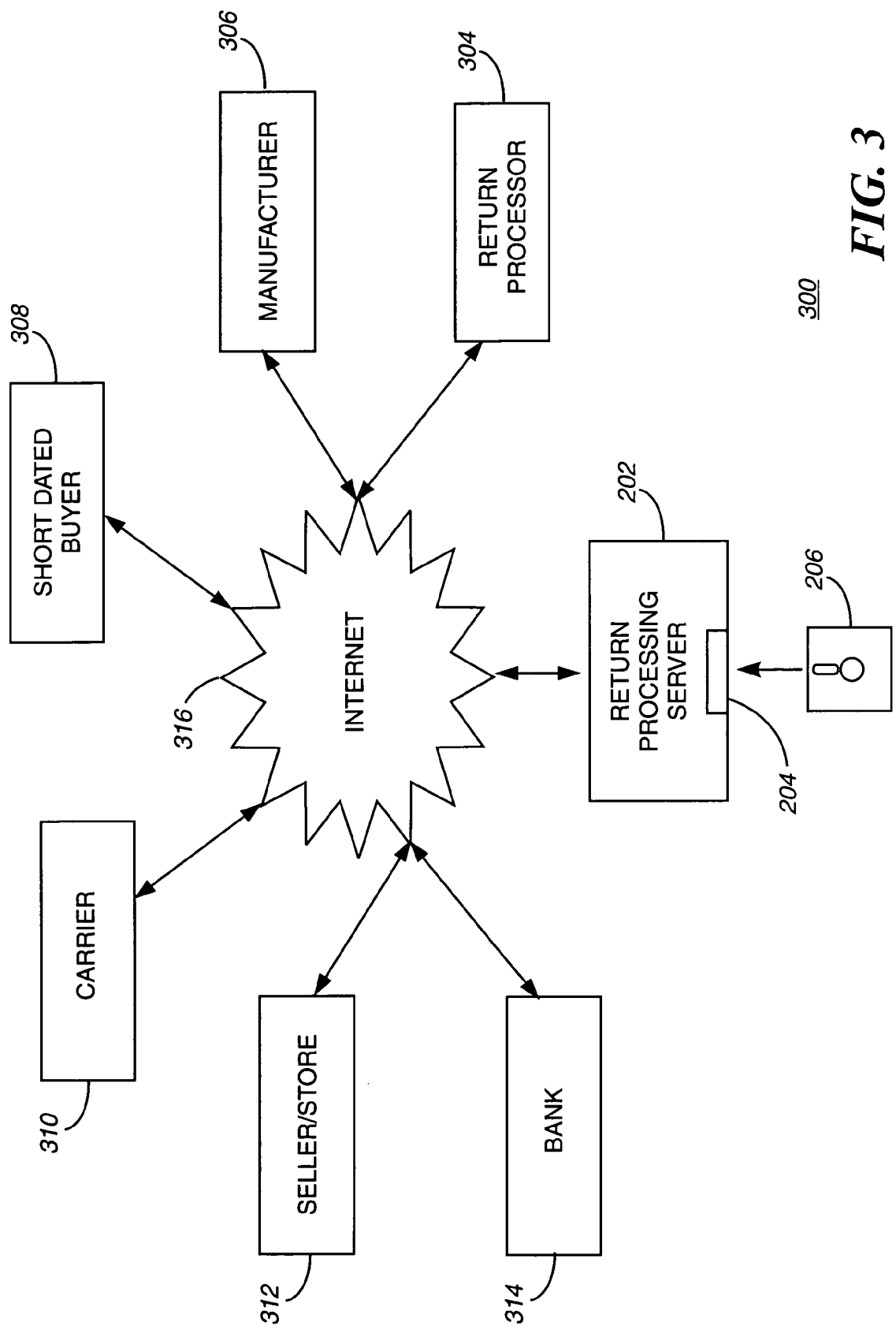
FIG. 3 is a block diagram of the major sites through which information is exchanged with the return-processing system of FIG. 2, according to the present invention.

FIG. 4 is a block diagram illustrating the software hierarchy for the information processing system of FIG. 3, according to the present invention. The hardware 400 is the information processing system of FIG. 2. BIOS (Basic Input Output System) 402 is a low level set of computer hardware instructions, usually stored in ROM 404, for communications between an operating system 506, device driver(s) 504 and return-processing server 202. Device drivers 404 are hardware specific code used to communicate between an operating system 506 and hardware peripherals such as a mouse, CD ROM drive or printer. Applications 508 are software application written in C/C++, Java, assembler or equivalent. Operating system 506 is the master program that loads after BIOS 502 initializes, that controls and runs the return-processing server 202. Examples of operating systems include DOS, Windows 3.1/95/98/NT/2000/2003/XP, Linux, Unix, Macintosh, OS/2 and equivalent. In one embodiment, the return-processing system an application 408 that resides on the return-processing server 202 and communicates with systems 304, 306, 308, 310, 312 and 314 over the network 316.

The return-processing server 202 may be implemented by combination of hardware and software. Moreover, the functionality required for using the invention may be embodied in computer-readable media (such as 3.5 inch diskette 206) to be used in programming an information-processing apparatus (e.g., a personal computer) to perform in accordance with the invention. Computer program means or computer program in the present context mean any expression, in any language, code or notation, or set of instructions intended to cause a system having an information processing capability to perform a particular function either directly or after either or both of the following: a) conversions to another language, code or notation; b) reproduction in a different material form.

Exemplary Return-processing Site Map

Figure 6:
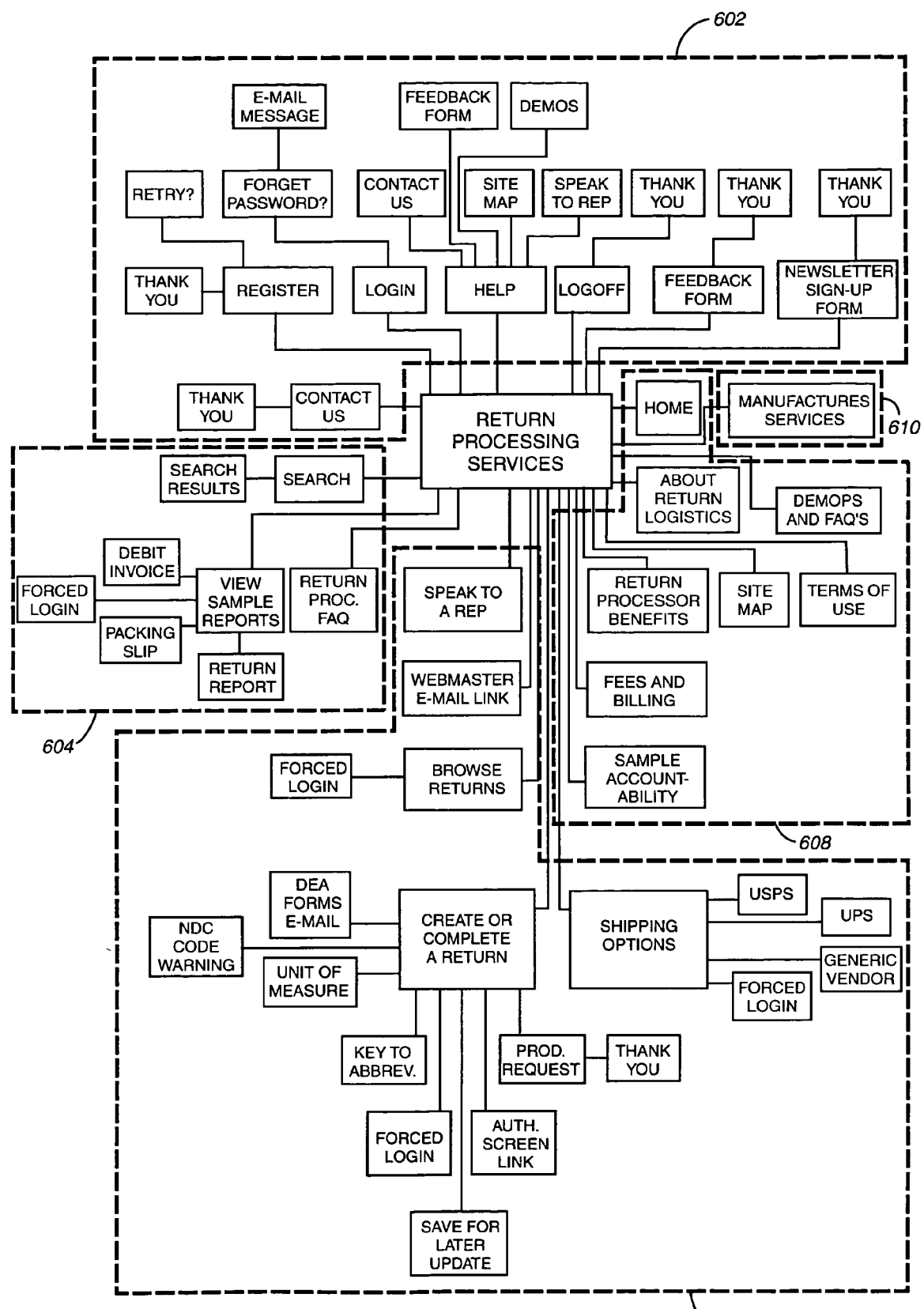
FIG. 6 is a block diagram of the over all site-map of the return-processing system server, according to the present invention.

FIG. 6 is an exemplary block diagram of the overall site map 600 of the return-processing system server, according to the present invention. The site map is described in groups:

- A login/register/logoff group/contact us group 602. This group 602 allows a store 312 and individuals using the site to setup accounts and passwords using method known to those in the art of e-commerce;
- A search group 604, enables a store 312 registered with the site 600 to view reports of returns that are submitted for processing as further illustrated in FIG. 10 below;
- A return group 606, allows a store 312 using a graphical user interface to create a return-processing slip as is discussed in FIG. 6 below. In a pharmaceutical embodiment for returning products, DEA (Drug Enforcement Agency) guidelines, FDA (Food and Drug Administration) and other government agency guidelines;
- A promotional group 608 to provide information about the return-processing services offered through the site 600; and
- A manufacturer's services 610 group provides information between the various manufacturers 306 and stores 312 through the site 600. The manufacturers use this portion of the site 600 to authorize the debit invoices and to process payment directly or through a representative, such as a bank 314. This is described further in FIG. 10 below.

Exemplary Return-processing Using Machine Readable Code

A return GUI is discussed in further detail below. In one embodiment, the present invention makes use of machine readable codes affixed to the product to be submitted for return-processing. The machine-readable code is any machine-readable code, including bar codes and a radio frequency identification (RFID) tags. Using machine readable codes, the item to be returned is scanned directly to the return-processing server 400 without the user needing to fill in fields.

Moreover, through use of hand-held scanners, in another embodiment, the return-processing server 400 receives information while the user is sweeping store shelves and other inventory locations. An optional response is sent to the hand-held device on whether to dispose of the product i.e. the product is expired or close to expiring or leave the item in inventory.

Exemplary Return-processing GUI For Creating a Return-Processing Slip

Figure 7:
FIG. 7 is an exemplary graphical user interface for creating a return-processing slip, according to the present invention.

FIG. 7 is an exemplary graphical user interface for creating a return-processing slip 700, according to the present invention. There are three main areas in the slip 700, a search area 702, a results area 708, and the details area 710. These areas correspond to the search group 504 of site map 6.

The search area 702 is a set of fields for a store 313 to enter information into a graphical user interface through a browser 112. The fields allow the searching of the database 214 coupled to server 202. Two fields are shown a product code 704, such as a UPC (Universal Product Code) or NDC (National Drug Code) 704. Other codes such as global trade industry number (GTIN), or an electronic product code (ePC) are also within the true scope and spirit of the invention.

Further, using one of the codes selected from a group of codes including UPS, NDC, ePC, GTIN, the present invention, in one embodiment, searches a database to provide a corresponding code. For example, if the GTIN code is provided, a corresponding NDC code is derived.

In addition, if the store 312 does not use product codes for field 704, a product name can be entered in field 706. Either a product code entry 704 or a product name 706 is entered. The database 214 for the manufacturer's products is searched coupled to the server 202. The results of the search are shown in area 708. The user can review product details in area 710. There are several fields in area 710, which are now described. Each of these fields is pulled from the search criteria 704 and 706 from the database 214 for the manufacturer:

Field 712 is the name of the product from the search results area 708.

Field 714 is the reason for return. In one embodiment, this is a pull-down menu such as damaged product, returned product, expired product, and others.

Field 716 is the return policy for this product.

Field 718 is a strength (if applicable), such as for a pharmaceutical.

Field 720 is the size of the product returned.

Field 722 is the lot or batch number.

Field 724 is the estimated return value (ERV). This is described in the in the glossary section 742.

Field 726 is the expiration date. This date is key for short-dated products.

Field 728 is the quantity of products returned.

Field 730 is an indication if the return is full or partial. A glossary is shown below 742 to help the user.

Field 732 is the disposition choices, such as return for credit, ship to a return processor 304, allows the short-dated product to be auctioned or donated. Instructions for disposition are shown below in area 740.

Field 734 is whether the seller can modify or delete these entries in the product details 710.

Below the product detail area 710 are a set of buttons search another product 736, save for later update 738, and return process 740, to enable the personnel from the store 312 to provide the next step during the return-processing.

Exemplary User Interface GUI for Authorizing Debit Invoice

Figure 8:
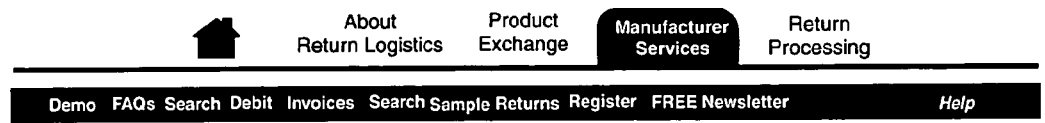
FIG. 8 is an exemplary user interface for authorizing a debit invoice, according to the present invention.

FIG. 8 is an exemplary user interface 800 for authorizing a debit invoice, according to the present invention. A manufacturer 306 (or agent of a manufacturer) reviews the return-processing slip created in FIG. 6, once submitted with process return button 638. There are two primary areas a search area 802, and the results area 820.

The search area 802 has several fields. Input can be made to any or all of these fields as desired by which will now be described.

Field 804 is the date of the return entered by the store 312 into the database 214.

Field 806 is the store 312 (or company) returning the product.

Field 808 is the destination company used for disposition, auction or donation destinations.

Field 810 is the destination of a city for the company of Field 808.

Field 812 is the destination state of the destination company of Field 808.

Field 814 is the manufacturer's product code.

Field 816 is the manufacturer's authorization number for the authorized debit invoice. This is sometimes called a RMA (return material authorization).

Field 818 is the credit memo field (if applicable) for a bank 314 to credit the seller 312.

Three buttons, search 818, find all 820 and clear 822, complete the search area 802. The search results 820 area shows the results from database 214 that match the search from search area 802. Several fields are shown as the result of the search 802. A product code field 822, a quantity 824, a unit of measure 826, a product name 828, a lot/batch 830, an expiration date 832, a reason for return 834, a estimated return value 836, and an actual return value 838 are displayed. The estimated return value 836 or ERU is an estimated return value of a product based on the average wholesale price. This is an amount suggested to the manufacturer 306 for return credit. The actual return value 838, or ARV is the actual amount credit by the manufacturer 306 to the seller/store 312.

In one embodiment where the seller/store received the ARV or return credit and the tax liability of unsaleable inventory is eliminated.

Exemplary User Interface Return-processing GUI

Figure 9:
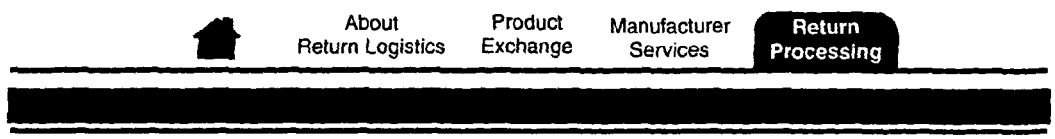
FIG. 9 is an exemplary user interface for reviewing products previously submitted in FIG. 7 for return-processing, according to the present invention.

FIG. 9 is an exemplary user interface 900 for reviewing products for return previously submitted in FIG. 6 for return-processing, according to the present invention. There are two main sections to return products interface comprising a report and shipping section 902 and a detail section 910. In the report and shipping section 902, a report icon 904, shipping label 906, and shipping confirmation button 908 are presented. The shipping label 906 creates a shipping label for the carrier 310. The shipping confirmation button 908 updates the database 214, that a return product is ready for shipping. The detail section 910 shows the details for the returns submitted for processing that are in the database 214.

Exemplary Manufacturing Service Site-Map

Figure 10:
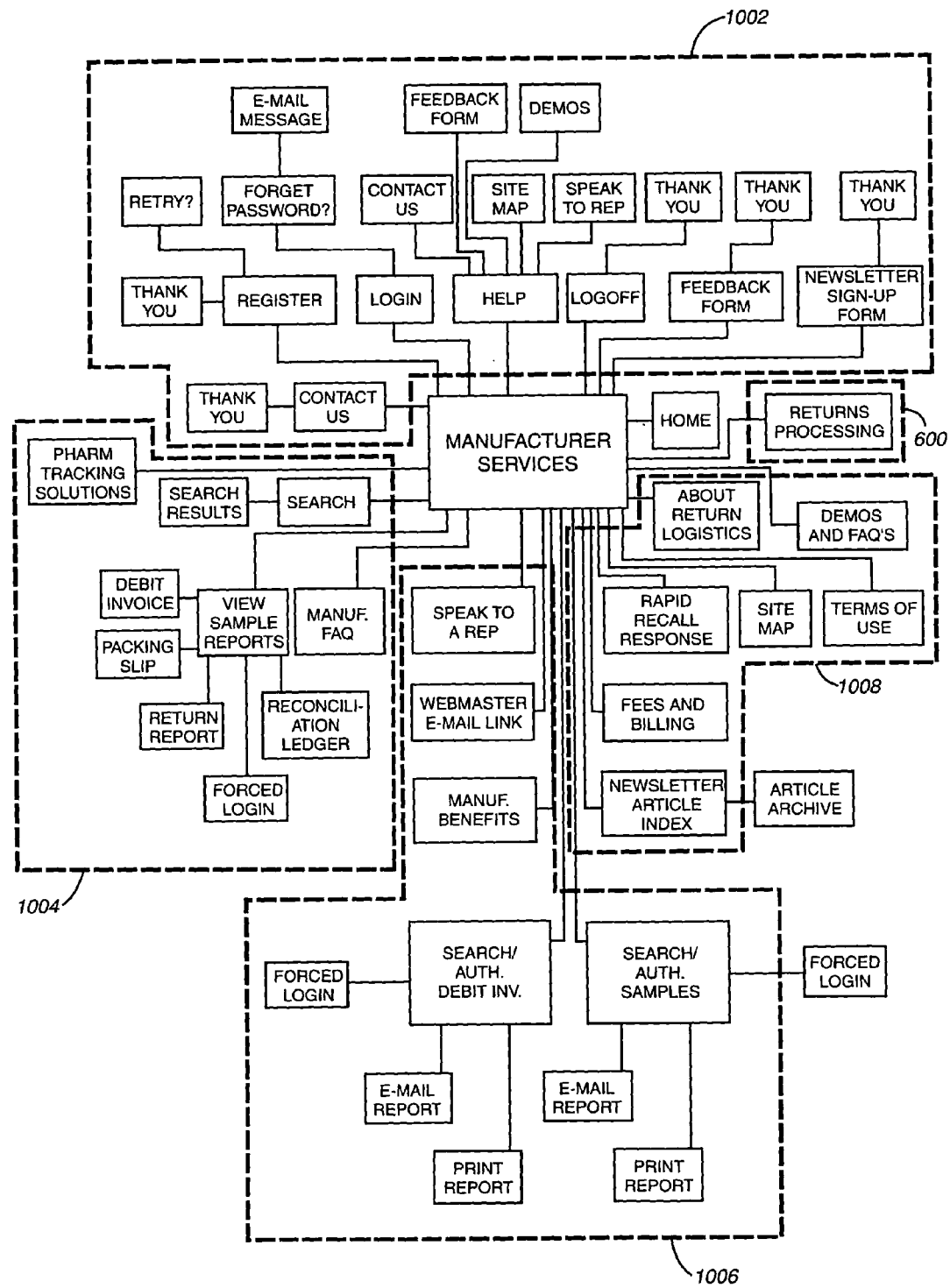
FIG. 10 is an exemplary block diagram of the overall site map of the manufacturing services group of FIG. 6, according to the present invention.

FIG. 10 is an exemplary block diagram of the overall site map 1000 of the manufacturing services group 610 of FIG. 6. The site is broken into five major groups as follows:

A login/register/logoff group/contact us group 1002, which is analogous to group 602 of FIG. 6 above.

A search group 1004, which is analogous to group 604 of FIG. 6 above.

A return group 1006, allows a store 312 using a graphical user interface to create a return-processing slip as is discussed in FIG. 6 below. In a pharmaceutical embodiment for returning products, DEA (Drug Enforcement Agency) guidelines, FDA (Food and Drug Administration) and other government agency guidelines. It is important to point out the Search Authority Samples 1010, which allows manufacturers to have samples used by a sales force returned for processing as well. For example, a pharmaceutical sales representative may have samples that are being returned because the promotion is over for the samples. The pharmaceutical representative would be the seller 312 and fill out return-processing form 600 of FIG. 6.

A promotional group 1008 which is analogous to group 1008 of FIG. 6 above.

A return-processing processor 600 group provides information which is described in FIG. 6 above.

Exemplary Return-processing Process Flow

The following table is a high-level flow diagram of the information being transmitted and received between the return-processing server 202 and the other servers of FIG. 3, according to the present invention.

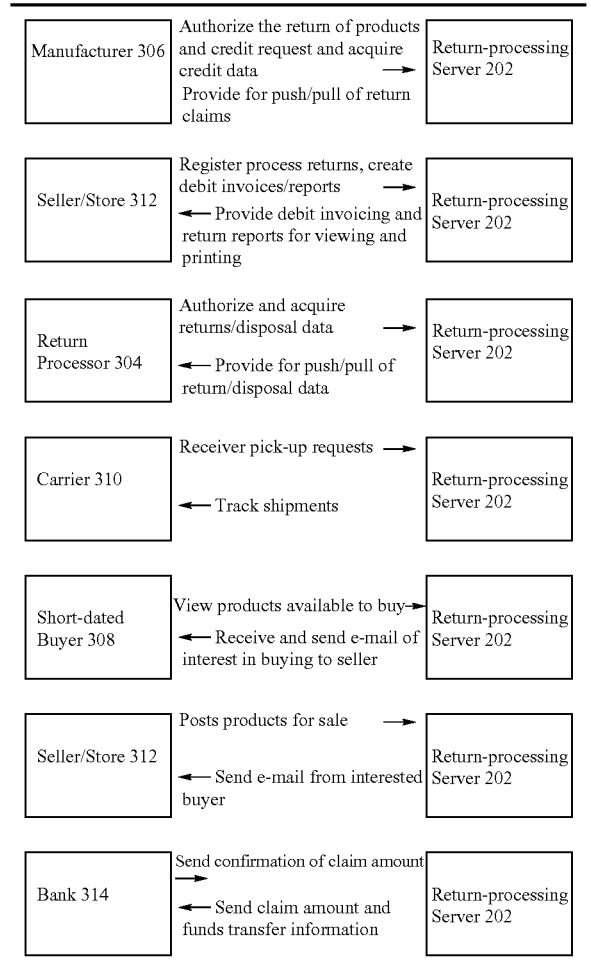

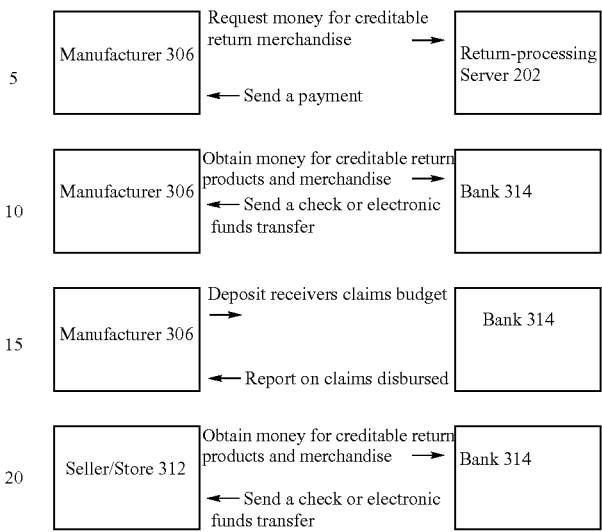

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method for managing return-processing of a product of a manufacturer, the method comprising:
    receiving, at a return-processing server separate from the manufacturer, via a network, information from a database regarding the manufacturer's return procedures for the product;
    receiving, at the return-processing server, via the network, information from a client system regarding the product, wherein receiving the information comprises receiving an expiration date of the product;
    determining that the product is short-dated by determining whether a difference between the expiration date and a present date is less than a threshold, wherein the threshold is a period of time less than a year;
    in response to determining that the product is short-dated:
    transmitting instructions for placing the product in a donation database, and
        receiving a request from the client system to place the product in the donation database;
    determining, at the return processing server, an amount to be credited in an electronic debit invoice;
    creating, at the return-processing server, the electronic debit invoice, wherein the electronic debit invoice includes debit authorization for creating an electronic debit in accordance with the information regarding the manufacturer's return procedures for the product and the information received from the client system regarding the product; and
    storing the electronic debit invoice in a debit invoice database accessible by the manufacturer for processing return credit.

2. The method according to claim 1, wherein prior to the receiving the information from the client system, the method further comprises transmitting a return processing template to the client system, the return-processing template being configured for receiving the information regarding the product to be submitted for return-processing.

3. The method according to claim 1, wherein prior to the receiving the information from the client system, the method further comprises scanning a machine readable code affixed to the product to be submitted for return-processing.

4. The method according to claim 3, wherein the scanning comprises scanning at least one of a bar code and a radio frequency identification (RFID) affixed to the product to be submitted for return-processing.

5. The method according to claim 4, further comprising:
automatically sending carrier shipping information to the client system for shipping the product to be submitted for return-processing, the carrier shipping information including information for printing a shipping label in accordance with a third party shipping entity for shipping the product to be submitted for return-processing according to the carrier shipping information.

6. The method according to claim 1, further comprising:
automatically sending carrier shipping information to the client system for shipping the product to be submitted for return-processing, the carrier shipping information including information for printing a shipping label in accordance with a third party shipping entity for shipping the product to be submitted for return-processing according to the carrier shipping information.

7. The method according to claim 1, wherein the instructions comprise instructions for placing the product in at least one of an auction database, a donation database and a refurbished database.

8. The method according to claim 1, wherein the receiving information from the client system includes receiving at least one of a global trade industry number (GTIN), an electronic product code (ePC), or national drug code system (NDC).

9. The method according to claim 8, wherein in response to receiving the GTIN, the method further comprises using the GTIN to lookup one of a corresponding ePC and NDC in a database query.

10. The method according to claim 8, wherein in response to receiving the ePC, the method further comprises using the ePC to lookup one of a corresponding GTIN and NDC in a database query.

11. The method according to claim 8, wherein in response to receiving the NDC, the method further comprises using the NDC to lookup one of a corresponding GTIN and ePC in a database query.

12. The method according to claim 1, further comprising:
receiving confirmation of a claim amount from a bank for payment on the debit invoice; and
receiving a return credit.

13. The method according to claim 1, further comprising:
receiving at the return-process server, via the network, confirmation of a claim amount from a bank for payment on the debit invoice, wherein the claim amount is based on the debit invoice.

14. The method of claim 1, further comprising:
transmitting a return processing template to the client system, wherein the template comprises a graphical user interface for receiving the information regarding the product.

15. The method of claim 1, further comprising:
receiving information from the client system regarding whether the client wants to receive an e-mail once the product becomes short-dated.

16. The method of claim 1, further comprising:
receiving information from the client system regarding whether the client wants to post information regarding the product to a product exchange bulletin board once the product becomes short-dated.

17. A computer-readable storage medium having stored thereon computer-executable instructions that, if executed by a processing device, cause the processing device to perform a method for managing return-processing of a product of a manufacturer, the method comprising:
receiving, at a return-processing server separate from the manufacturer, via a network, information from a database regarding the manufacturer's return procedures for the product;
receiving at the return-processing server, via the network, information from a client system regarding the product, wherein receiving the information comprises receiving an expiration date of the product;
determining that the product is short-dated by determining whether a difference between the expiration date and a present date is less than a threshold, wherein the threshold is a period of time less than a year;
in response to determining that the product is short-dated:
transmitting instructions for placing the product in a donation database, and
receiving a request from the client system to place the product in the donation database;
determining, at the return processing server, an amount to be credited in an electronic debit invoice;
creating, at the return-processing server, the electronic debit invoice, wherein the electronic debit invoice includes debit authorization for creating an electronic debit in accordance with the information regarding the manufacturer's return procedures for the product and the information received from the client system regarding the product; and
storing the electronic debit invoice in a debit invoice database accessible by the manufacturer for processing return credit.

18. The computer-readable storage medium according to claim 17, wherein prior to the receiving the information from the client system, the method further comprises transmitting a return-processing template to the client system, the return-processing template being configured for receiving the information regarding the product to be submitted for return-processing.

19. The computer-readable storage medium according to claim 17, wherein prior to the receiving the information from the client system, the method further comprises scanning a machine readable code affixed to the product to be submitted for return-processing.

20. The computer-readable storage medium according to claim 19, wherein the scanning comprises scanning at least one of a bar code and a radio frequency identification (RFID) affixed to the at least one product to be submitted for return-processing.

21. The computer-readable storage medium according to claim 17, the method further comprising:
automatically sending carrier shipping information to the client system for shipping the product to be submitted for return-processing the carrier shipping information including information for printing a shipping label in accordance with a third party shipping entity for shipping the product to be submitted for return-processing according to the carrier shipping information.

22. The computer-readable storage medium according to claim 21, the method further comprising:

automatically sending carrier shipping information to the client system for shipping the product to be submitted for return-processing the carrier shipping information including information for printing a shipping label in accordance with a third party shipping entity for shipping the product to be submitted for return-processing according to the carrier shipping information.

23. The computer-readable storage medium according to claim 17, wherein the instructions comprise instructions for placing the product in at least one of an auction database, a donation database and a refurbished database.

24. The computer-readable storage medium according to claim 17, wherein the receiving information from the client system includes receiving at least one of a global trade industry number (GTIN), an electronic product code (ePC), or national drug code system (NDC).

25. The computer-readable storage medium-according to claim 24, wherein in response to receiving the GTIN, the method further comprises using the GTIN to lookup one of a corresponding ePC and NDC in a database query.

26. The computer-readable storage medium-according to claim 24, wherein in response to receiving the ePC, the method further comprises using the ePC to lookup one of a corresponding GTIN and NDC in a database query.

27. The computer-readable storage medium-according to claim 24, wherein in response to receiving the NDC, the method further comprises using the NDC to lookup one of a corresponding GTIN and ePC in a database query.

28. The computer-readable readable medium-according to claim 17, wherein the method further comprises:
receiving confirmation of a claim amount from a bank for payment on the debit invoice; and
receiving a return credit.

29. The computer-readable medium according to claim 17, the method further comprising:
receiving at the return-process server, via the network, confirmation of a claim amount from a bank for payment on the debit invoice, wherein the claim amount is based on the debit invoice.

30. A return-processing server for managing return-processing of a product of a manufacturer, the return-processing server, which is separate from the manufacturer, comprising:
means for receiving, via a network, information from a database regarding the manufacturer's return procedures regarding the product;
means for receiving, via the network, information from a client system of the product including means for receiving an expiration date of the product;
means for determining that the product is short-dated by determining whether a difference between the expiration date and a present date is less than a threshold, wherein the threshold is a period of time less than a year;
means for transmitting instructions for placing the product in a donation database;
means for receiving a request from the client system to place the product in the donation database;
means for determining an amount to be credited in a debit invoice;
means for creating the debit invoice, wherein the electronic debit invoice includes debit authorization for creating an electronic debit in accordance with the information regarding the manufacturer's return procedures for the product and the information received from the client system regarding the product; and
means for storing the debit invoice in a debit invoice database accessible by the manufacturer for processing return credit.

31. The return-processing server according to claim 30, further comprising means for presenting a return-processing template to the client system for receiving the information regarding the product to be submitted for return-processing.

32. The return-processing server according to claim 30, wherein the means for receiving the information from the client system of the product to be submitted for return-processing further includes means for receiving information scanned from a machine readable code affixed to the product to be submitted for return-processing.

33. The return-processing server according to claim 32, wherein the machine readable code includes at least one of a bar code and a radio frequency identification (RFID) affixed to the product to be submitted for return-processing.

34. The return-processing server according to claim 32, further comprising:
means for automatically sending carrier shipping information to the client system for shipping the product to be submitted for return-processing, the carrier shipping information including information for printing a shipping label in accordance with a third party shipping entity for shipping the product to be submitted for return-processing according to the carrier shipping information.

35. The return-processing server according to claim 30, further comprising:
means for automatically sending carrier shipping information to the client system for shipping the product to be submitted for return-processing, the carrier shipping information including information for printing a shipping label in accordance with a third party shipping entity for shipping the product to be submitted for return-processing according to the carrier shipping information.

36. The return-processing server according to claim 30, wherein the instructions comprise instructions for placing the product in at least one of an auction database, a donation database and a refurbished database.

37. The return-processing server according to claim 30, wherein the means for receiving information from the client system of the product to be submitted for return-processing includes receiving at least one of a global trade industry number (GTIN), an electronic product code (ePC), or national drug code system (NDC).

38. The return-processing server according to claim 37, further comprising means for receiving the GTIN and using the GTIN to lookup one of a corresponding ePC and NDC in a database query.

39. The return-processing server according to claim 37, further comprising means for receiving the ePC and using the ePC to lookup one of a corresponding GTIN and NDC in a database query.

40. The return-processing server according to claim 37, further comprising means for receiving the NDC and using the NDC to lookup one of a corresponding GTIN and ePC in a database query.

41. The return-processing server according to claim 30, further comprising:
means for receiving, via the network, confirmation of a claim amount from a bank for payment on the debit invoice, wherein the claim amount is based on the debit invoice.

42. The return-processing server according to claim 41, wherein the means for receiving confirmation of a claim amount from a bank for payment on the debit invoice includes receiving a return credit to reduce a tax liability related to the manufacturers product.

\* \* \* \* \*